US009591035B2

(12) United States Patent
Kuo et al.

(10) Patent No.: US 9,591,035 B2
(45) Date of Patent: Mar. 7, 2017

(54) METHOD AND APPARATUS FOR AUTHORIZING A USER OR A USER DEVICE BASED ON LOCATION INFORMATION

(75) Inventors: Cynthia Kuo, Mountain View, CA (US); Quinn Jacobson, Sunnyvale, CA (US); Jonathan Ledlie, Cambridge, MA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1134 days.

(21) Appl. No.: 13/190,304

(22) Filed: Jul. 25, 2011

(65) Prior Publication Data
US 2012/0192252 A1 Jul. 26, 2012

Related U.S. Application Data

(60) Provisional application No. 61/367,248, filed on Jul. 23, 2010.

(51) Int. Cl.
*G06F 15/16* (2006.01)
*H04L 29/06* (2006.01)
*G06F 21/31* (2013.01)

(52) U.S. Cl.
CPC .......... *H04L 65/1069* (2013.01); *G06F 21/31* (2013.01); *G06F 2221/2111* (2013.01); *G06F 2221/2133* (2013.01)

(58) Field of Classification Search
CPC .............................. G06F 21/31; H04L 65/1069

USPC ......... 713/168–174, 182–186, 202; 709/225, 709/229; 726/2–8
See application file for complete search history.

(56) References Cited

U.S. PATENT DOCUMENTS

| 2008/0146193 A1 | 6/2008 | Bentley et al. |
| 2008/0209223 A1 | 8/2008 | Nandy et al. |
| 2009/0077629 A1* | 3/2009 | Douceur ................. G06F 21/36 726/2 |
| 2009/0210924 A1* | 8/2009 | Maurer ................... G06F 21/31 726/2 |

FOREIGN PATENT DOCUMENTS

WO      2005053209 A2      6/2005

OTHER PUBLICATIONS

International Search Report and Written Opinion, received in corresponding patent Cooperation Treaty Application No. PCT/FI2011/050662, dated Nov. 22, 2011, 13 pages.

* cited by examiner

*Primary Examiner* — Evans Desrosiers
(74) *Attorney, Agent, or Firm* — Ditthavong & Steiner, P.C.

(57) ABSTRACT

A method comprises receiving a request for generating a challenge for a device or a user of the device. The method also comprises determining location information associated with the device. The method further comprises determining one or more characteristics that are detectable based, at least in part, on the location information. Furthermore, the method comprises generating the challenge based, at least in part, the one or more characteristics.

14 Claims, 15 Drawing Sheets

METHOD AND APPARATUS FOR AUTHORIZING A USER OR A USER DEVICE BASED ON LOCATION INFORMATION

RELATED APPLICATION

This application claims priority to U.S. provisional Application No. 61/367,248, "METHOD AND APPARATUS FOR AUTHENTICATING A USER OR A USER DEVICE BASED ON LOCATION INFORMATION," filed on Jul. 23, 2010, which is herein incorporated by reference in its entirety.

BACKGROUND

Modern computer and communication networks provide access to an ever increasing variety and number of online services (e.g., databases, services, commerce, etc.) to users and user devices. Many of these online services deal with potentially sensitive or private information (e.g., personal information, financial information, etc.). As a result, services providers have traditionally employed various security measures in order to protect users' information as well as their network resources, databases, and the like, and to provide a certain quality of service and trust over their networks. Traditionally, authentication mechanisms include requiring users to have/create user accounts and passwords, device authentication through digital certificates, and/or other identification means. Once authenticated, users or their devices are authorized to access information, networks, databases, and other resources. Further, some services authorize users with CAPTCHAs to verify that the users are human and not automated computer programs or robots (bots). However, network security threats are becoming more sophisticated and can potentially overcome these security measures. As a result, service providers and device manufacturers face significant technical challenges to developing security measures to protect user information and network resources.

SOME EXAMPLE EMBODIMENTS

Therefore, there is a need for robust and user-friendly methods for authorizing users and/or user devices.

According to one embodiment, a method comprises receiving a request for generating a challenge for a device or a user of the device. The method also comprises determining location information associated with the device. The method further comprises determining one or more characteristics that are detectable based, at least in part, on the location information. Furthermore, the method comprises generating the challenge based, at least in part, on the one or more characteristics.

According to another embodiment, an apparatus comprising at least one processor, and at least one memory including computer program code, the at least one memory and the computer program code configured to, with the at least one processor, cause, at least in part, the apparatus to receive a request for generating a challenge for a device or a user of the device. The apparatus is also caused to determine location information associated with the device. The apparatus is further caused to determine one or more characteristics that are detectable based, at least in part, on the location information. Furthermore, the apparatus is caused to generate the challenge based, at least in part, on the one or more characteristics.

According to another embodiment, a computer-readable storage medium carrying one or more sequences of one or more instructions which, when executed by one or more processors, cause, at least in part, an apparatus to receive a request for generating a challenge for a device or a user of the device. The apparatus is also caused to determine location information associated with the device. The apparatus is further caused to determine one or more characteristics that are detectable based, at least in part, on the location information. Furthermore, the apparatus is caused to generate the challenge based, at least in part, on the one or more characteristics.

According to another embodiment, an apparatus comprises means for receiving a request for generating a challenge for a device or a user of the device. The apparatus also comprises means for determining location information associated with the device. The apparatus further comprises means for determining one or more characteristics that are detectable based, at least in part, on the location information. Furthermore, the apparatus comprises means for generating the challenge based, at least in part, on the one or more characteristics.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-8.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for authorizing one or more users and/or one or more user devices based on location information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
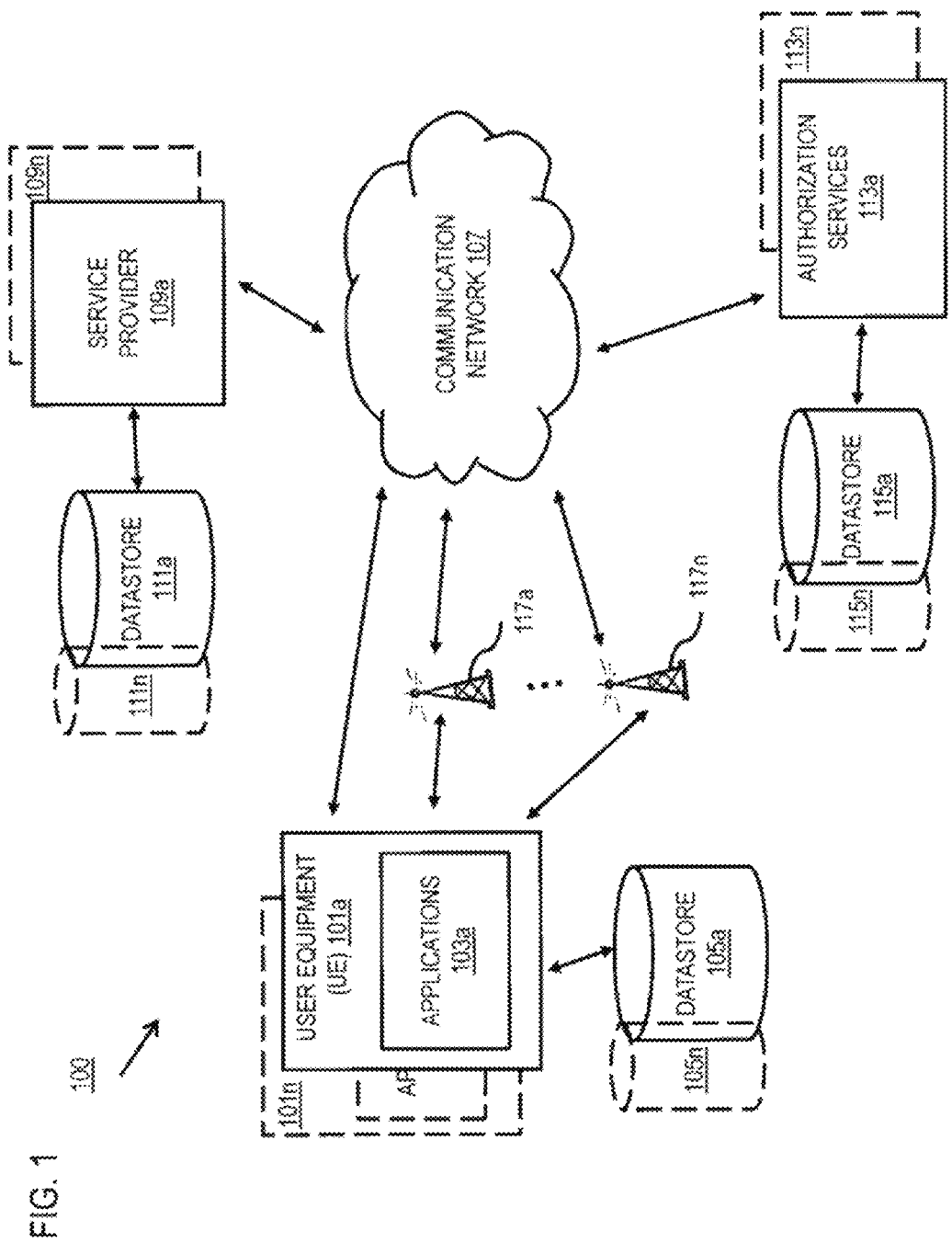
FIG. 1 is a diagram of a system capable of authorizing a user or user device based on location information, according to one embodiment.

FIG. 1 is a diagram of a system capable of authorizing a user or user device based on location information, according to one embodiment. As discussed above, a broad range of services, transactions, commerce, etc. are provided and/or are conducted over the internet. By way of example, these online services include financial services, sale of merchandise and services, online trading, social networking, email, access to one or more databases, etc. Because these services are often targets of a growing number of attacks, security risks to the merchants, service providers and users of these online services have been steadily rising. To combat such risks as online fraud, identity theft, attacks on networks, unauthorized account and database access, the network administrators have often implemented security measures including requiring user registration, user password and/or other identifying parameters.

In one common scenario, automated software programs, or "bots," can pose security risks and/or otherwise cause problems for many online services. For example, bots can be used to automatically sign up for email addresses from online email services (e.g., so that the addresses can be used for spam or other fraudulent purposes), or to automatically purchase large blocks of tickets for concerts or shows (e.g., so that tickets can be resold at higher prices). According to one conventional approach, to distinguish software bots from actual human users, many services rely on CAPTCHA (Completely Automated Public Turing test to tell Computers and Humans Apart) challenges. A CAPTCHA generally is a challenge-response based test, which tries to assess whether the response is likely generated by human by displaying a phrase, image, text, and/or audio that has been distorted to make it difficult for software bots recognize and identify correctly. In other words, humans typically can recognize the distorted phrase while many computer programs cannot, thereby providing a means to differentiate a software bot from a human as a form of service authorization. However, as software bots increase in sophistication, the CAPTCHA challenge typically has to increase the distortion of the phrase or image to prevent the bots from passing challenge. This, in turn, also makes the challenge more difficult for the human user to pass, thereby decreasing user experience.

In another scenario, some services may want to restrict access to information to only those users or devices present within a physical location. For example, a mapping or navigation service may want to provide access to information for determining location (e.g., radio frequency (RF) fingerprints/signatures of a specific location) only when the requesting device is within proximity of a given location. In this way, the RF fingerprints data (which includes potentially sensitive information such as Wi-Fi access point information) is restricted only to users who need the information for location determination in a particular area. However, conventional security mechanisms (e.g., user name/password, conventional CAPTCHA challenges or tests, etc.) generally do not include location restrictions, and therefore, are generally not suitable for applications involving location-based restrictions.

Furthermore, services may want to restrict access to known users or devices present within a physical location. An authentication system, such as user name/password login or digital certificate verification, may be used in conjunction with physical location information for service authorization.

Another access authorization method includes verifying the geographical location of the user device which is requesting access to the one or more services. An advantageous and substantially automated method includes for the network server to generate and send a RF fingerprint challenge to the user device and examine one or more responses received from the user device. An RF fingerprint (also known as an RF signature) is an on-device positioning method based on one or more RF signals and related parameters; such as media access control address (MAC), basic service set identifier (BSSID), network name; observed by a user device at a given geographical location. The user device, for example a mobile device, may identify a RF fingerprint present at its current geographical location and, based upon this RF fingerprint and its association with a predefined geographical location, may determine its current location to be the predefined geographical location with which the RF fingerprint has been previously associated. Further, the user device may be presented with one or more known RF fingerprints and then required to provide one or more other RF fingerprints observed by the user device.

Currently available authorization methods including user-device based methods as well as CAPTCHA methods based on distorted text, image, audio and/or the like still are susceptible to malicious computer programs and/or are not user friendly for humans.

To address this problem, system 100 of FIG. 1 enables an authorization service to generate one or more challenges based on information specific to a given location for granting access to one or more users and/or one or more user devices to one or more services. More specifically, the system 100 generates one or more challenges (e.g., for location verification, human user verification, etc.) incorporating one or more characteristics of a geographical location of a user and/or user device. In one embodiment, the characteristics are observable, measurable, or otherwise detectable when the user and/or user device are physically present in or within proximity of the geographical location.

In one embodiment, the system 100 selects characteristics of the geographical location that are difficult for a software bot to correctly identify. Challenges based on these characteristics can then be used as "location-based CAPTCHA challenges" to distinguish between software bots and humans. For example, the system 100 generates a location-based challenge wherein responding users or devices answer questions about a particular point-of-interest (or other object) in their immediate physical vicinity. Answering the questions or challenges indicates that the user is human because such a method would require, at least, a semantic understanding of the challenges and an awareness of current surroundings. However, a computer cannot automatically respond to the one or more challenges because, at least, it has no awareness of its physical surroundings and finding the one or more correct responses online can be difficult without, at least, natural language understanding. Further, the one or more correct responses can demonstrate that the user is likely physically located where the location information is indicating.

In another embodiment, the location-based challenge may include both a known characteristic and an unknown characteristic of the geographical location. The responding user or user device is prompted to provide responses to both the known and unknown characteristics. If the responding user or user device provides a correct response with respect to the known characteristic, the system 100 may infer that the response to the unknown characteristic is also correct. In this way, the system 100 can increase its database of known characteristics about a particular geographical location based on user provided information.

In yet another embodiment, the system 100 uses the challenge as access authorization (e.g., access to location-specific data) by verifying the geographical location of the user device which is requesting access to the one or more services. Access can then be granted based, at least in part, on the verification. An advantageous and substantially automated method includes for the network server to generate and send a RF fingerprint challenge to the user device and examine one or more responses received from the user device. In one embodiment, an RF fingerprint (also known as an RF signature) is an on-device positioning method based on one or more RF signals and related parameters; such as MAC, BSSID, network name; observed by a user device at a given geographical location. The user device, for example a mobile device, may identify a RF fingerprint present at its current geographical location and, based upon this RF fingerprint and its association with a predefined geographical location, may determine its current location to be the predefined geographical location with which the RF fingerprint has been previously associated. Further, the user device may be presented with one or more known RF fingerprints and then required to provide one or more other RF fingerprints observed by the user device.

In yet another embodiment, location information can be used to authenticate a user and/or a user device. For example, access to a physical space and/or a service may be restricted to a user and/or a user device. If the user and/or the user device can successfully respond to a geographically-based challenge, the user and/or the device may both be authenticated and/or authorized for a service or other resources.

As shown in FIG. 1, the system 100 comprises one or more user equipment (UE) 101*a*-101*n* (also collectively referred to as UE 101 and/or user device) having connectivity to one or more service providers 109*a*-109*n* (also collectively referred to as service provider 109) and one or more authorization services 113-*a*-113*n* (also collectively referred to as authorization services 113 or authorization services 113) via a communication network 107. Further, the UE 101 has connectivity to one or more radio frequency (RF) sources 117*a*-117*n*, which can include cellular and non-cellular sources and can be part of and/or have connectivity to the communication network 107. The UEs 101*a*-101*n* include applications 103*a*-103*n* (also collectively referred to as applications 103) where applications 103 can include, for instance, one or more user interfaces, one or more communications applications, one or more web browsers, and/or other applications to support sensors such as GPS, audio/video devices and/or the like available on the UE 101.

Further, the service provider 109 can provide a broad range of online services; such as commerce, financial services, database access, social networking, education, internet access; and/or the like. In the example of FIG. 1, the UE 101, service provider 109, and authorization services 113 include one or more data sets in their respective datastores 105*a*-105*n* (also collectively referred to as datastore 105), 111*a*-111*n* (also collectively referred to as datastore 111) and 115*a*-115*n* (also collectively referred to as datastore 115). Data maintained by the UE 101, service provider 109, and authorization services 113 can be that of a static nature (e.g., textual data, graphical data) or executable (e.g., streaming media such as audio or video content).

Moreover, the service provider 109 and authorization services 113 may be a hosted server platform, data warehouse, service portal, web server with associated service interface or the like for enabling access to the services at the service provider 103 and/or at the database services 113. Depending on system requirements, the datastores 111 and 115 may be distributed wherein data sets are dispersed. Alternatively, service providers 103 and authorization services 113 may communicate with one another for enabling data exchange, therefore facilitating further distributed processing capability. Such an arrangement may be useful for maintaining very large data sets and providing a wider range of service.

In addition to the service provider 103 and authorization services 113, the UE 101 may also have connectivity via the communication network 107 to other UEs (e.g., another mobile device). While shown identically in the figure, respective UEs 101a and 101n need not be implemented identically. In one embodiment, the service provider 103 and authorization services 113 and their respective datastores 111 and 115 may be combined into one or more network elements in one or more configurations to provide substantially same functionality and/or services.

Figure 2:
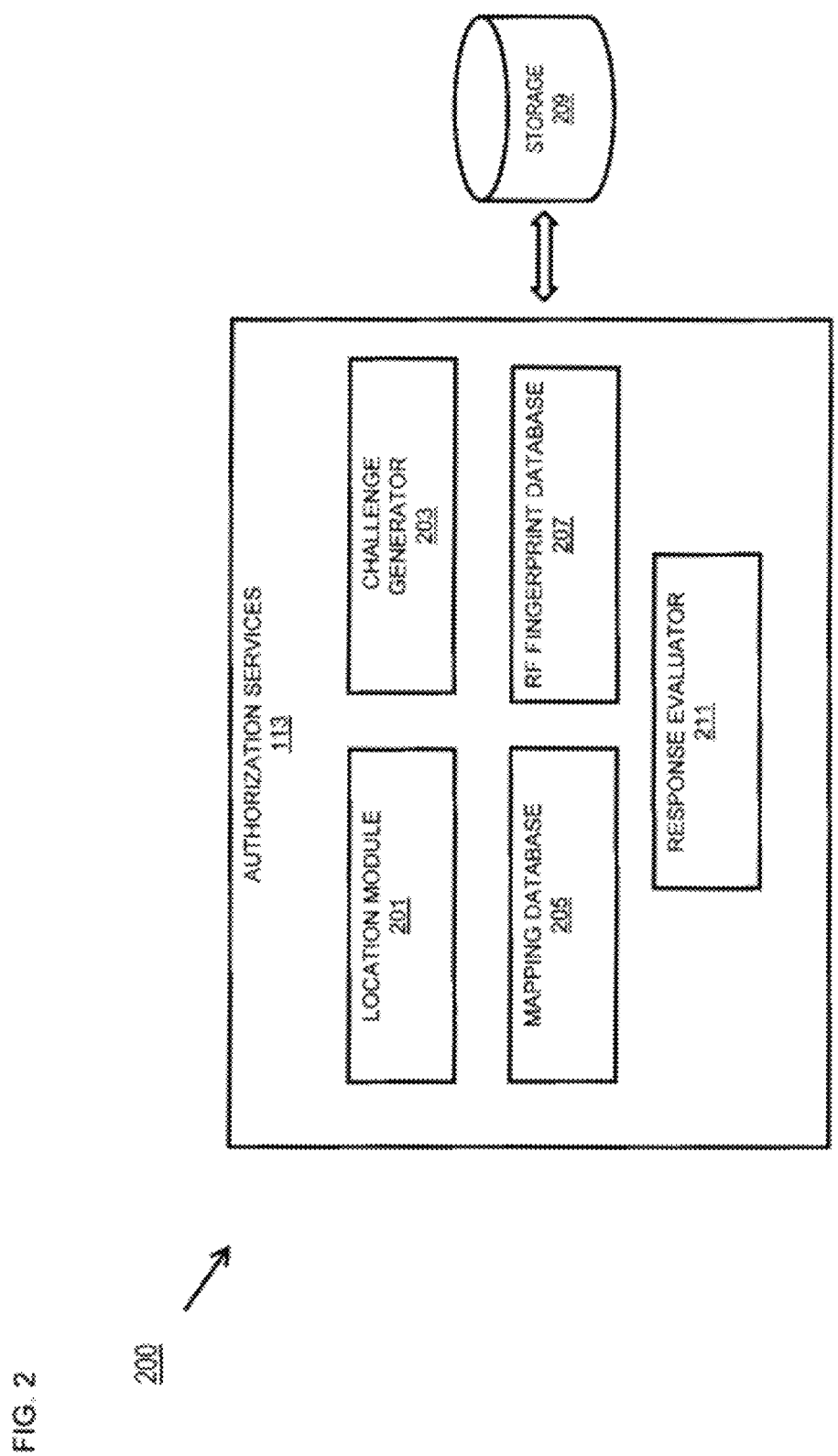
FIG. 2 is a diagram of components of authorization services, according to one embodiment.

FIG. 2 is a diagram of components of an authorization services, according to one embodiment. By way of example, the authorization services 113 includes one or more components for enabling authorization of a user and/or a user device such as UE 101. It is contemplated that the functions of these components may be combined in one or more components or performed by other components of equivalent functionality. In one embodiment, the authorization services 113 includes, at least, a location module 201, a challenge generator 203, one or more mapping databases 205, one or more RF fingerprint databases 207, one or more storage 209 and a response evaluator 211. The location module 203 determines the location of the UE 101 based, at least, on information (e.g., location information and/or one or more RF fingerprints) received from the UE 101 and/or the communication network 107.

Further, the challenge generator 201 generates one or more challenges while utilizing at least one of the one or more mapping database 205, the one or more RF fingerprint database 207 and the determined location of the UE 101 and communicates the challenge to the UE 101. Furthermore, the response evaluator 211 evaluates one or more received responses from the UE 101 by, at least, comparing the one or more responses to the one or more mapping database 205 and/or to the one or more RF fingerprint database 207. Moreover, if the one or more responses were evaluated to be substantially correct, then data from the one or more responses can be used to update the one or more databases 209, 105, 111 and 115, and/or other databases. The received one or more responses and/or data from the one or more responses can be stored at storage 209 for further and/or later processing.

The UE 101, service provider 109 and authorization services 113 can communicate with each other, other network elements and/or access other data stores by communicating, for example, over the communication network 107. By way of example, the communication network 107 of system 100 includes one or more networks such as a data network (not shown), a wireless network (not shown), a telephony network (not shown) or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the service provider 109, and the authorization services 113 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 3:
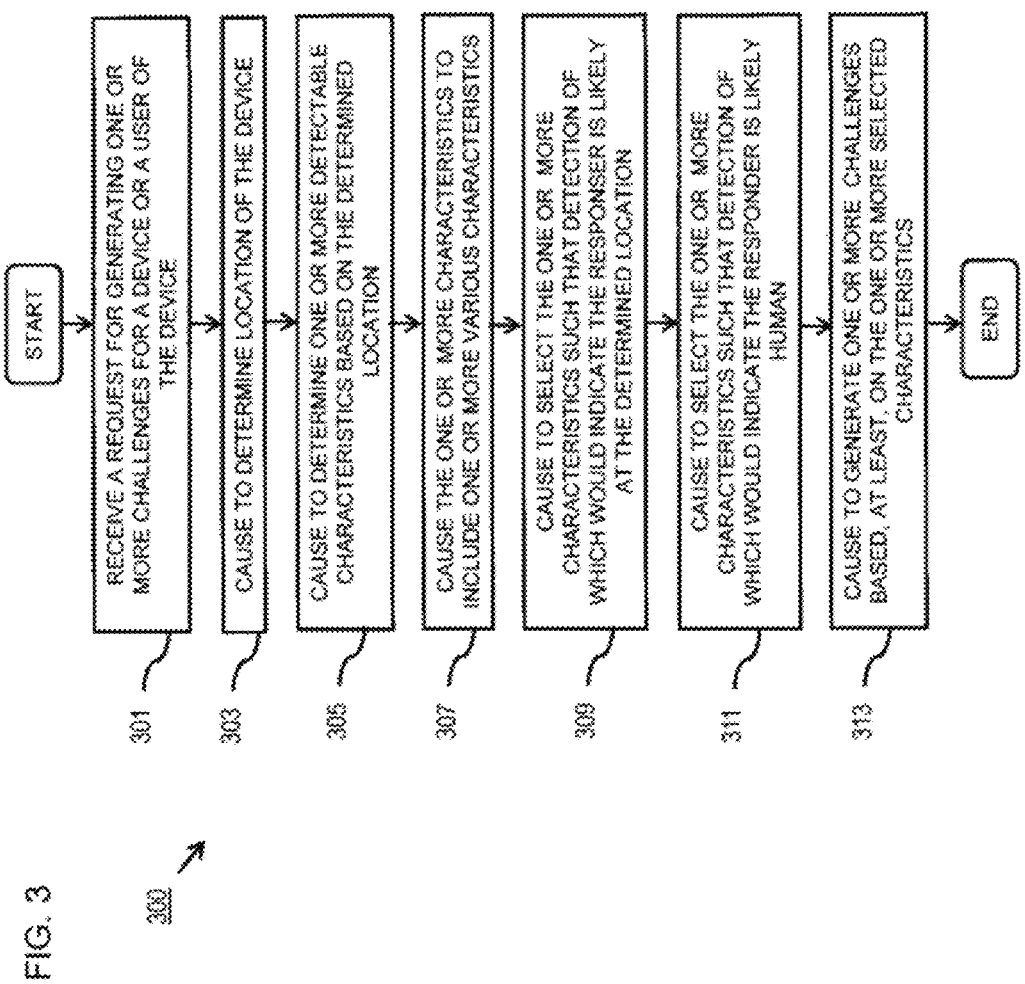
FIG. 3 is a flowchart depicting a process for receiving a request for and generating one or more challenges for a device or a user of the device, according to one embodiment.

FIG. 3 is a flowchart depicting a process for receiving a request for and generating one or more challenges for a device or a user of the device, according to one embodiment. In one embodiment, the authorization services 113 performs the process 300 and is implemented in, for instance, a chip set including a processor and a memory as shown FIG. 14. At step 301, the authorization services 113 receives a request for generating one or more challenges for a device or a user of the device. In one embodiment, the request is generated from a service provider such as the service provider 109

(e.g., for authorization) when a user or a user device, such as UE 101, is requesting for a service. In one example use case, the request for service is for the user to purchase a concert ticket or for purchasing a newly released product such as a mobile phone or a music CD wherein the service provider 109 wishes to make the service and/or the product available only to human users instead of bots. Another example of service request is for the user device to access and/or to retrieve one or more data sets from one or more databases.

At step 303, for example, the authorization services 113 (e.g., via the location module 201 of FIG. 2) determines the location of the device based, at least, on location information received from the device. In one embodiment, the location information is, at least, based on GPS signals, cellular triangulation and/or RF fingerprints received from the user device. At step 305, for example, the challenge generator 203 determines one or more detectable characteristics based on the determined location. In one embodiment, the challenge generator 203 utilizes the location information and information from the mapping database 205 to determine one or more detectable characteristics to include in the one or more challenges such as in FIGS. 7-12 discussed below. In another embodiment, the challenge generator 203 utilizes the RF fingerprint information and information from the RF fingerprint database 207 to determine one or more detectable characteristics to include in the one or more challenges. In another embodiment, the challenge generator 203 utilizes one or more user and/or user device information to generate one or more location-based CAPTCHA challenges.

At step 307, the one or more characteristics of 305 are to include one or more various characteristics. At step 309, one or more characteristics are selected such that detection of which would indicate the responder is likely at the determined location. In one embodiment, the challenge (e.g., a location-based CAPTCHA) requests information, from the user and/or the user device, regarding the location of the user and/or the user device. For example, such as in FIG. 9, the user is prompted to identify one or more points of interest (POI) near where the user is currently located. In another embodiment, such as in FIG. 8, the device is prompted to determine one or more RF fingerprints and send to the authorization services 113 for evaluation.

At step 311, one or more characteristics are selected such that detection of which would indicate the responder is likely human. As noted earlier, in certain transactions and service renderings, the service provider needs to differentiate a human user from a computer program, for example, to prevent bots from accessing certain services. However, as computer technology and computer programs have become more advanced, one of the methods used to distinguish a computer program from a human user, is to prompt the user to identify certain characteristics related to the location of the user. Although it is possible that a computer program can employ one or more computer programs in trying to respond to the challenge, it is more likely that a human user being at a specific location can respond substantially more accurately than a computer program. At step 313, one or more challenges are generated based, at least, on the one or more selected characteristics.

Figure 4:
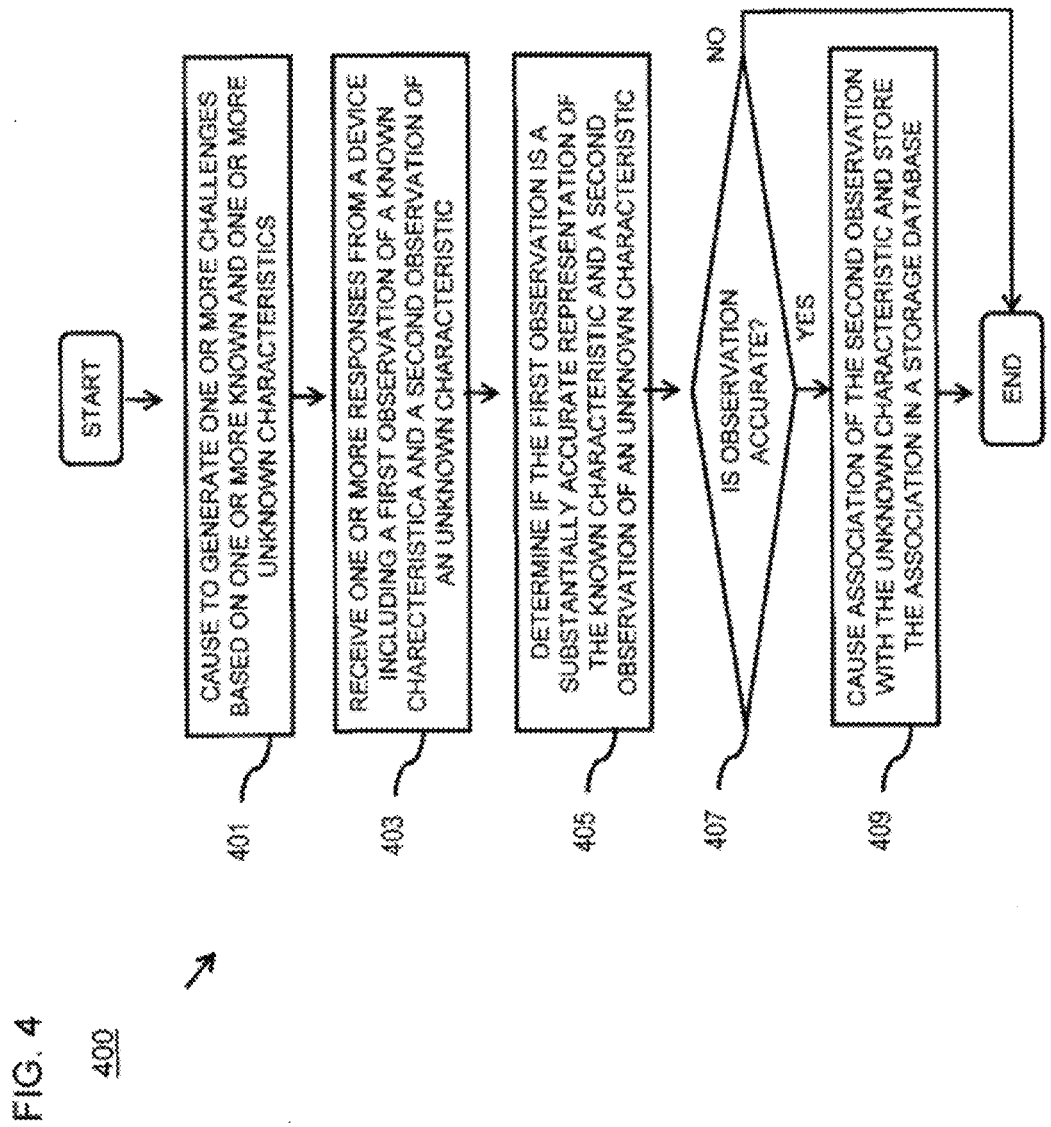
FIG. 4 is a flowchart depicting a process for generating one or more challenges based on one or more known and one or more unknown characteristics, according to one embodiment.

FIG. 4 is a flowchart depicting a process for generating one or more challenges based on one or more known and one or more unknown characteristics, according to one embodiment. In one embodiment, the authorization services 113 performs the process 400 and is implemented in, for instance, a chip set including a processor and a memory as shown FIG. 14. In order to generate new, different and accurate challenges, the authorization services 113 needs access to one or more reliable databases from which the needed characteristics can be selected from. In order to add new data to the one or more databases, such as the mapping database 205 and/or the RF fingerprint database 207, the new data is at least substantially verified so that the generated challenges can be substantially accurate.

At step 401, one or more challenges are generated based on one or more known and one or more unknown characteristics. In one embodiment, the one or more challenges are based on one or more known characteristics such that one or more substantially correct responses are already known and available in the database such as the mapping database 205 and/or the RF fingerprint database 207. In another embodiment, the one or more challenges are based on one or more characteristics such that one or more substantially correct responses may not be known. In another embodiment, the one or more challenges are generated based, at least, in part, on the one or more known and the one or more unknown characteristics.

At step 403, one or more responses are received from a device including a first observation of the one or more known characteristics and a second observation of the one or more unknown characteristics. In one embodiment, the one or more responses are determined as to whether the responses are to the one or more known or to the one or more unknown characteristics. At step 405, a determination is made whether the first observation is a substantially accurate representation of the one or more known characteristics and a second observation of one or more unknown characteristics.

At step 407, if the observation is determined to be substantially accurate, then the process proceeds to step 409 where the one or more second observations are associated with the one or more unknown characteristics and are stored in the database such as the mapping database 205 and/or the RF fingerprint database 207.

Figure 5:
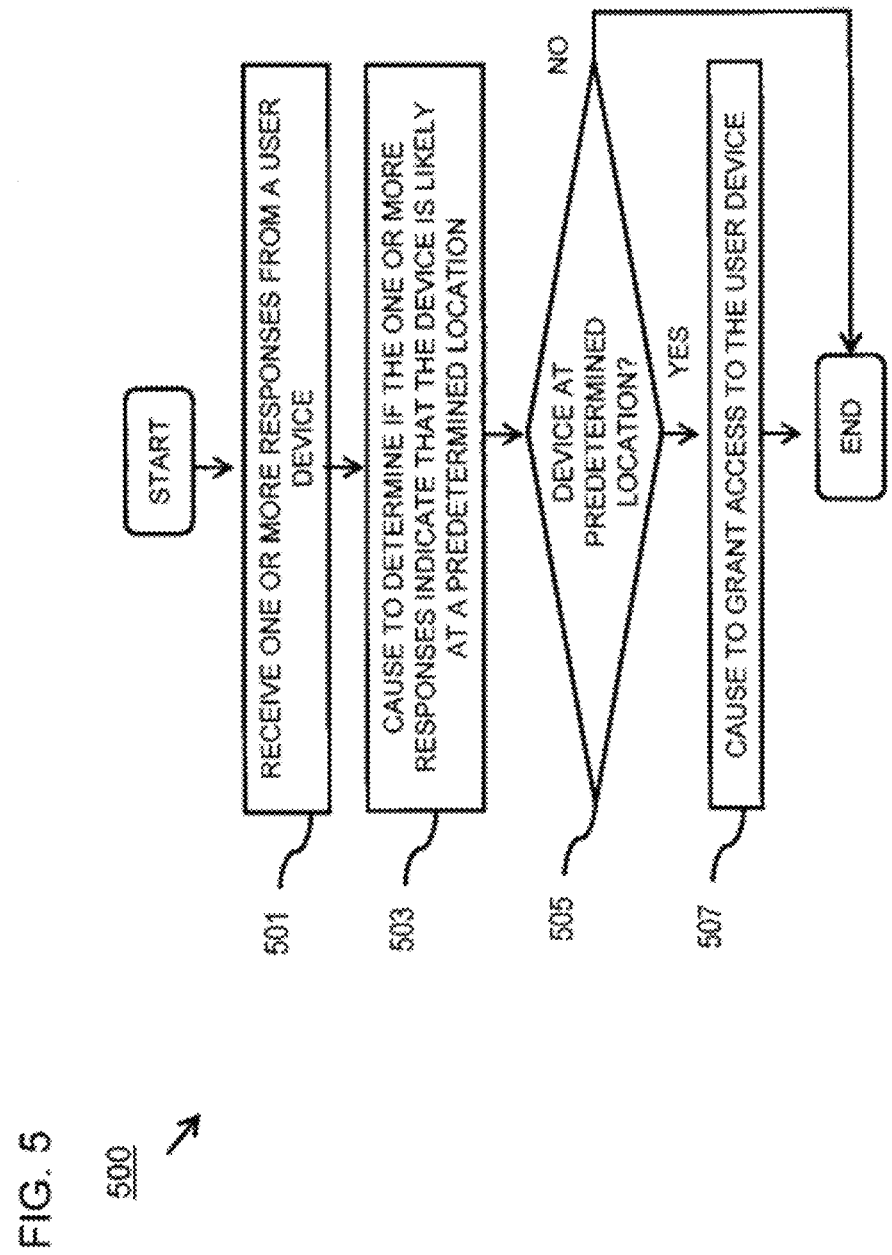
FIG. 5 is a flowchart depicting a process for receiving one or more responses from a user device and determining if the device is likely at a predetermined location, according to one embodiment.

FIG. 5 is a flowchart depicting a process for receiving one or more responses from a user device and determining if the device is likely at a predetermined location, according to one embodiment. In one embodiment, the authorization services 113 performs the process 500 and is implemented in, for instance, a chip set including a processor and a memory as shown FIG. 14. As the number of user devices rise; for security, quality of service, and/or the like; the service providers need to control access to the available data on the one or more databases. One method to control and grant access to a user device is to determine whether a user device is actually located at a particular location when requesting access to one or more databases. Furthermore, other users contributing to the one or more databases would want to restrict access to users who are actually in that location of interest and would feel more comfortable that the one or more databases won't be misused by users not located in the area.

At step 501, one or more responses are received from a user device. In one embodiment, the one or more responses include one or more RF fingerprints which include MAC+BSSID+network name. At step 503, it is determined whether the one or more responses indicate that the user device is likely at a predetermined location. In one embodiment, the one or more response are compared to one or more known characteristics available in the one or more databases such as the RF fingerprint database 207. At step 505, if a determination is made that the user device is likely located at the predetermined location then at step 507, access to the one or more databases is granted to the user device.

Figure 6:
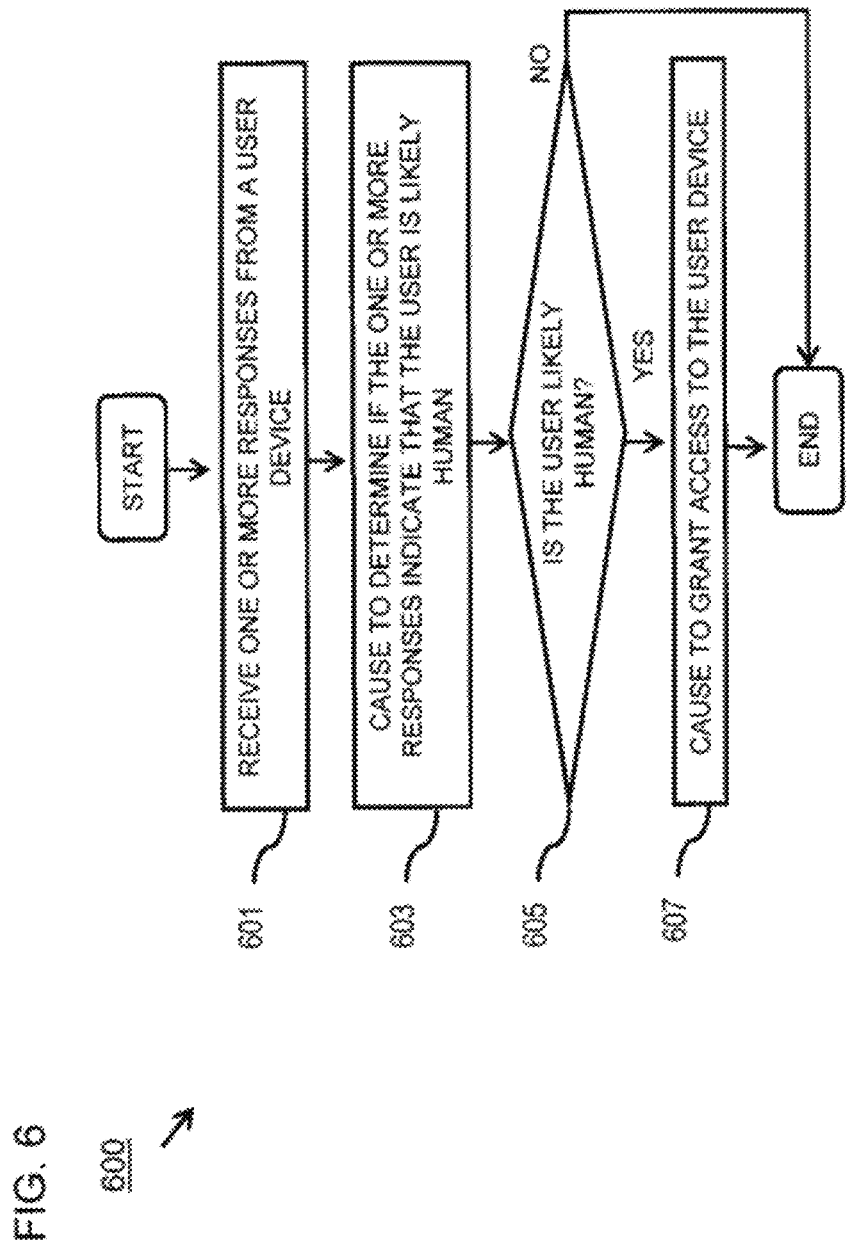
FIG. 6 is a flowchart depicting a process for receiving one or more responses from a user device and determining if the user is likely human, according to one embodiment.

FIG. 6 is a flowchart depicting a process for receiving one or more responses from a user device and determining if the user is likely human, according to one embodiment. In one embodiment, the authorization services 113 performs the process 600 and is implemented in, for instance, a chip set including a processor and a memory as shown FIG. 14. At step 601, one or more responses are received from a user device, for example, one or more responses to one or more location-based CAPTCHA challenges. At step 603, a determination is made whether the one or more responses indicate that the user is likely human. More specifically, the challenge may include a question about a characteristic of a particular point-of-interest or object that can be easily observed by a human but not easily identifiable by a computer or software bot. For example, the challenge may prompt the responding user or device to identify the color of a sign on a building across the street or prompt about the relative locations of two landmarks at the location. If the responding user or device correctly specifies the characteristic, the authorization services 113 can, for instance, assume that the user is likely human.

At step 605, if it is determined that the user is likely human, then at step 607 access to the requested one or more services is granted to the user and/or to the user device. In one embodiment, access may be provided only when the user is within proximity of the geographic location that was subject of the challenge. In another embodiment, access may also be restricted based on time, duration, specific rights (e.g., read, write, execute, etc.), or other similar characteristics. In yet another embodiment, access may be provided with no further restrictions.

FIGS. 7-12 are examples of one or more challenges and one or more responses, according to one or more embodiments.

Figure 7:
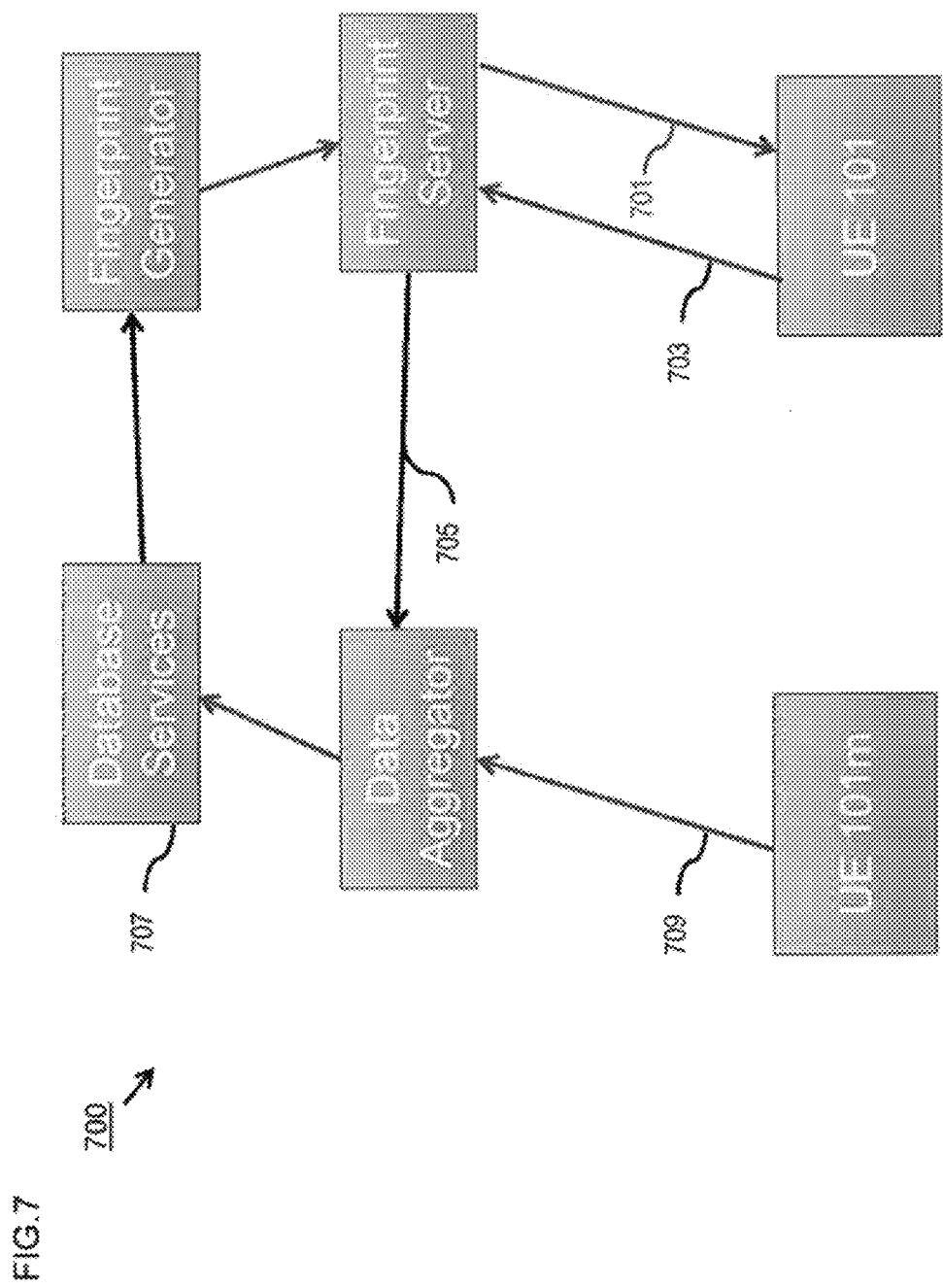
FIGS. 7-12 are examples of one or more challenges and one or more responses, according to one or more embodiments.

FIG. 7 depicts an example authorization system 700. In one embodiment, one or more services (e.g., an RF fingerprint map location-specific signal map, and/or other databases) are only available to one or more users and/or one or more user devices, which are located substantially at or near a given geographical location. For example, the UE 101 requests one or more services which results in a challenge 701 to UE 101 to provide one or more hard-to-guess information sets, such as one or more BSSIDs, one or more ambient sensory information (such as temperature, audio, video, image, and/or the like), one or more sets of MACs and/or one or more network names (e.g., Joe's coffee shop, John's home) observable at the given geographical location. Further, the UE 101 provides a response 703 which can include one or more sets of data for authorization. Such authorization can substantially eliminate and/or reduce access to the one or more services by one or more unauthorized users and/or one or more unauthorized user devices. In another embodiment, if one or more substantially correct responses are received from one or more users and/or one or more devices, one or more databases such as 105, 111, 115, 209, 707 and/or the like are updated with one or more data sets 705 included in the one or more responses 703 so a broader range of data sets can be available to the authorization services. In another embodiment, UE 101m provides RF fingerprint information 709 to one or more databases.

Figure 8:
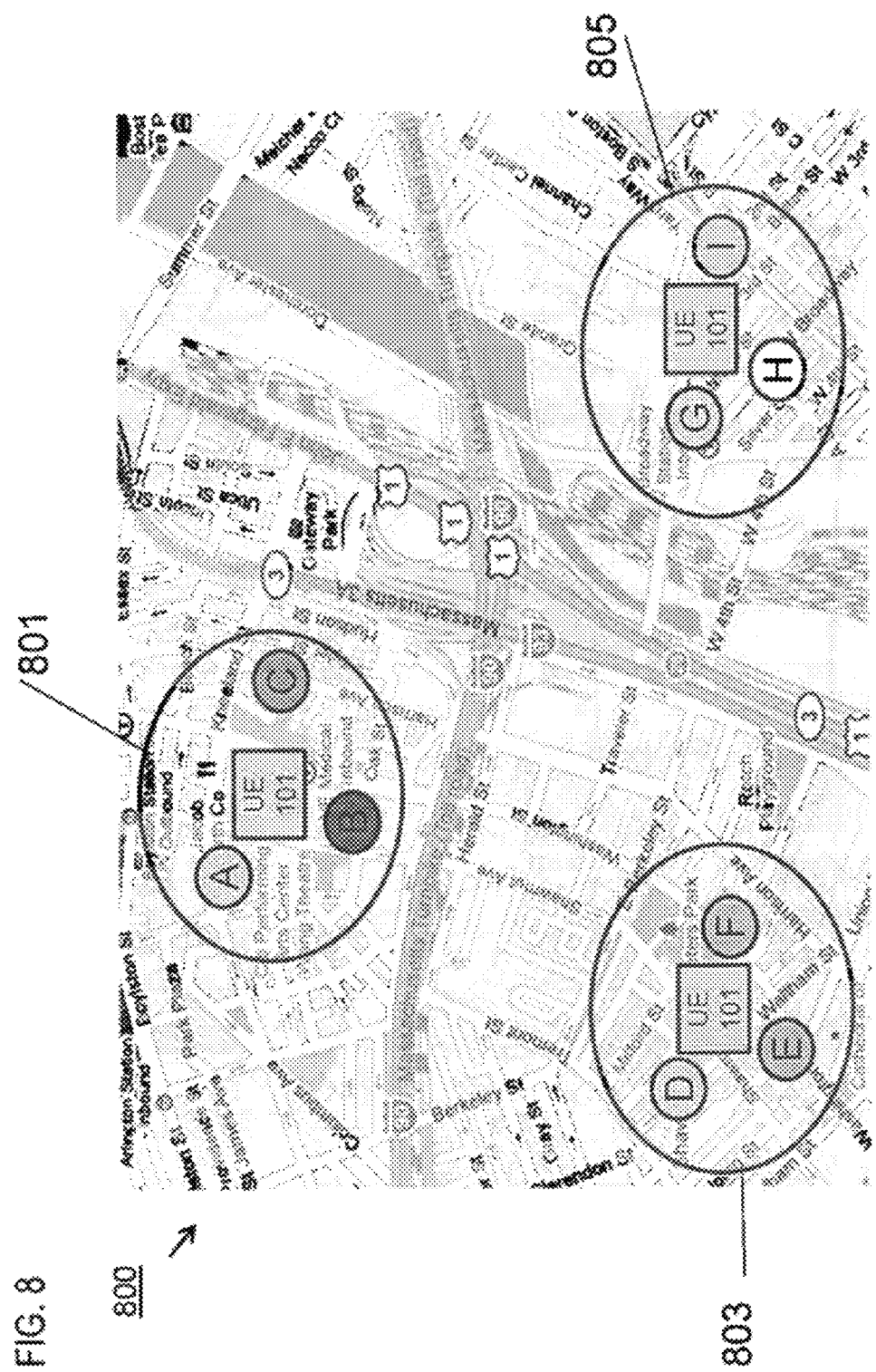

FIG. 8 depicts a geographical location 800 representation of one or more RF fingerprints. The RF fingerprints 801, 803, 805 identified by each of one or more UE 101 can include, at least, signal strength, MAC, and/or other signal parameters for the RF signals received from each access point (A), (B), (C), (D), (E), (F), (G), (H) and (I), which are positioned at different geographical locations 801, 803 and 805. Each access point of this embodiment has a unique MAC, such as 0xa3b, 0x6d2 and 0xbc4 respectively for (A), (B), and (C). Because each access point is differently situated with respect to a given UE 101, both in terms of distance and in terms of intervening structures, the RF fingerprint received by a given UE 101 at 801, within this example geographical location is different than the UE 101 at 803. By associating a particular RF fingerprint with a given geographical location, the location in which the UE 101 is currently located may be identified by matching, at least, the current RF fingerprint received by the UE 101 with the particular RF fingerprint associated with the geographical location. One or more database of existing RF fingerprints may be generated through an initial site survey that builds and populates a signal strength map and produces fingerprints of a given geographical location. Fingerprints of a particular location may change over time based on reconfiguration, repositioning or replacement of the access points from which the signals are received for forming one or more RF fingerprints. Additionally, a RF fingerprint may be altered or revised by using one or more user inputs to augment the database over time. FIGS. 9-12 depict one or more geographical location based challenge/response examples.

Figure 9:
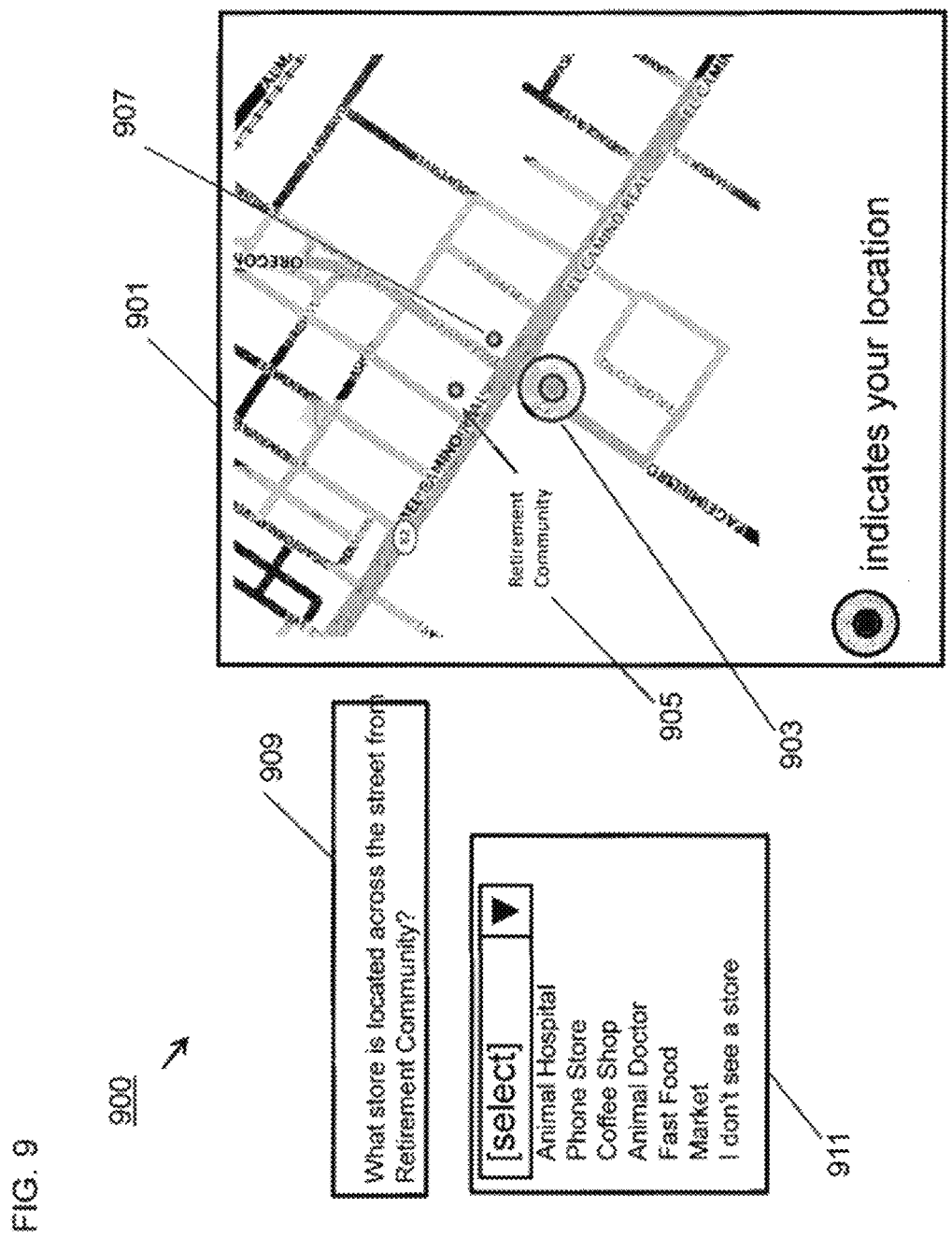

FIG. 9 depicts example 900 presented at a user device. In one embodiment, location of the user device is determined based, at least in part, on the location information; such as GPS, cellular triangulation, RF fingerprint and/or the like; provided by the user and/or the user device. Further, a geographical representation 901, such as a map, is presented at a user device indicating, at least, location of the user device 903, location of one or more known point of interest (POI) 905 and location of one or more known and/or unknown challenge 907. Furthermore, the challenge can be presented to the user in form of audio, video, text 909 and/or the like whereby the user is prompted to provide a response in one or more of the forms, for example, by selecting a textual response from a list 911 of possible responses. In another embodiment, if the user selects a response indicating that the user does not see one or more elements of the challenge, the authorization system can provide a different challenge.

Figure 10:
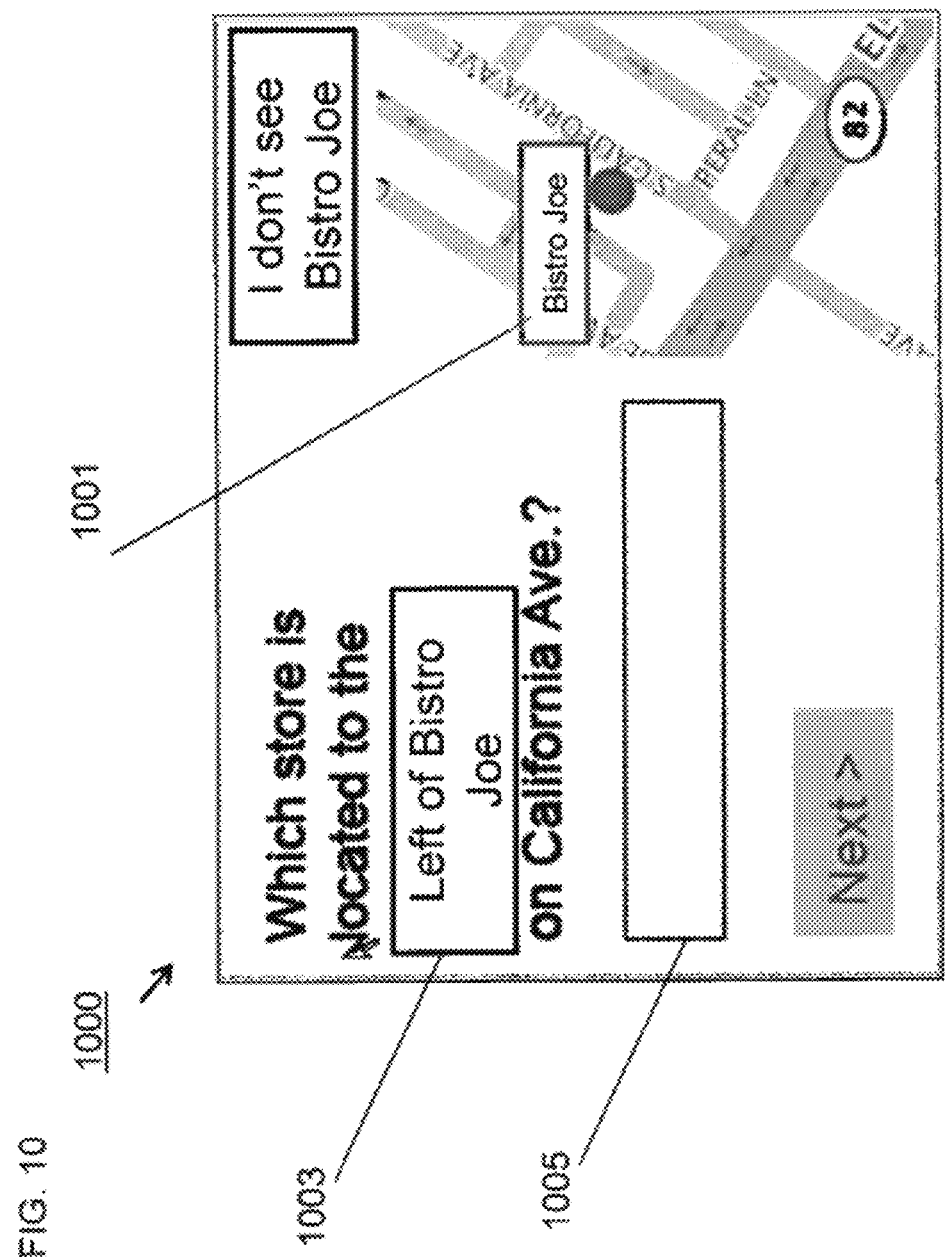

FIG. 10 depicts example 1000 presented at a user device. In one embodiment, the user is presented with the location of one or more known POI 1001 and is challenged with providing additional information 1003 related to the POI. In one embodiment, the user can provide the response by entering (typing) in the response in specific user interface (UI) field 1005.

Figure 11:
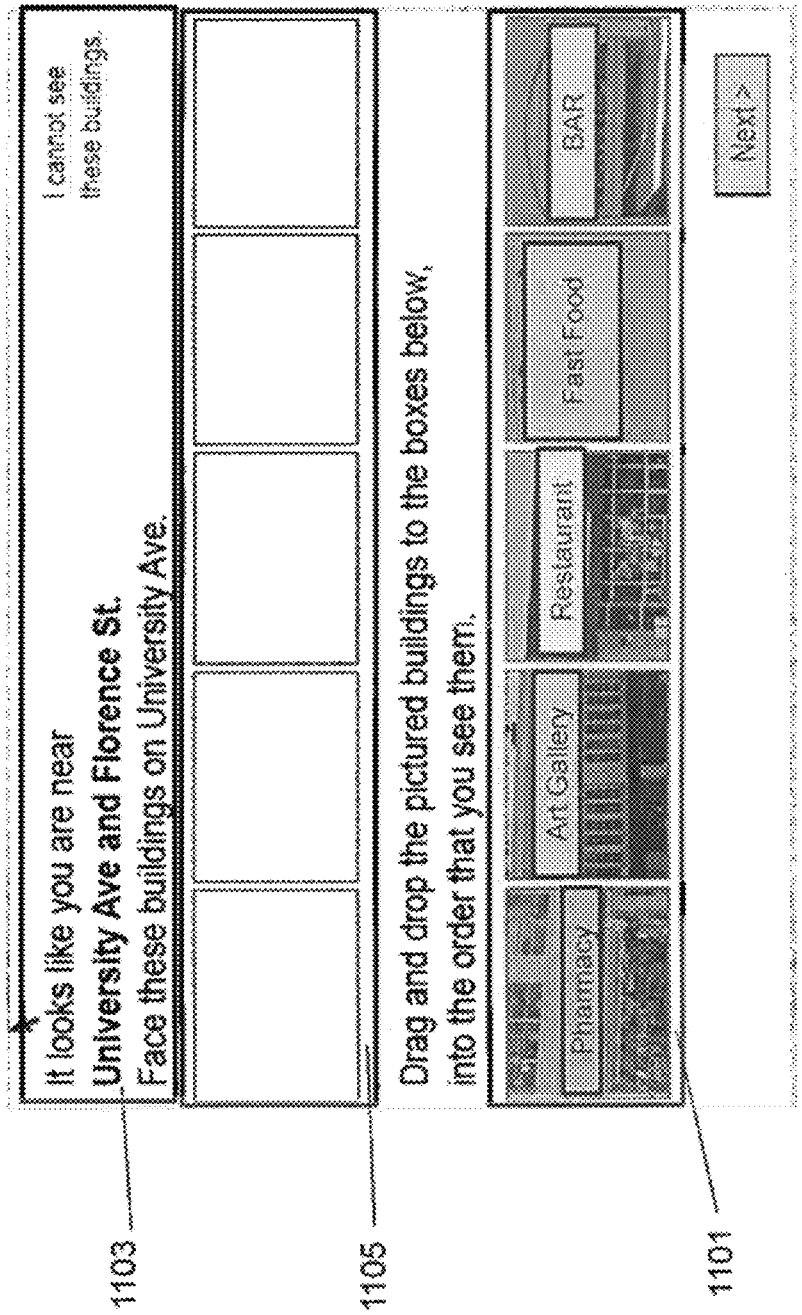

FIG. 11 depicts example 1100 presented at a user device. In one embodiment, the user is presented with a list of one or more POI 1101 located near the user and is challenged to perform a task 1103, for example, in a UI field 1105, arrange the location of the POI as is observed by the user. In another embodiment, information such as name and/or type of one or more of the one or more POI in 1101 are unknown and the user is challenged to provide the one or more information.

Figure 12:
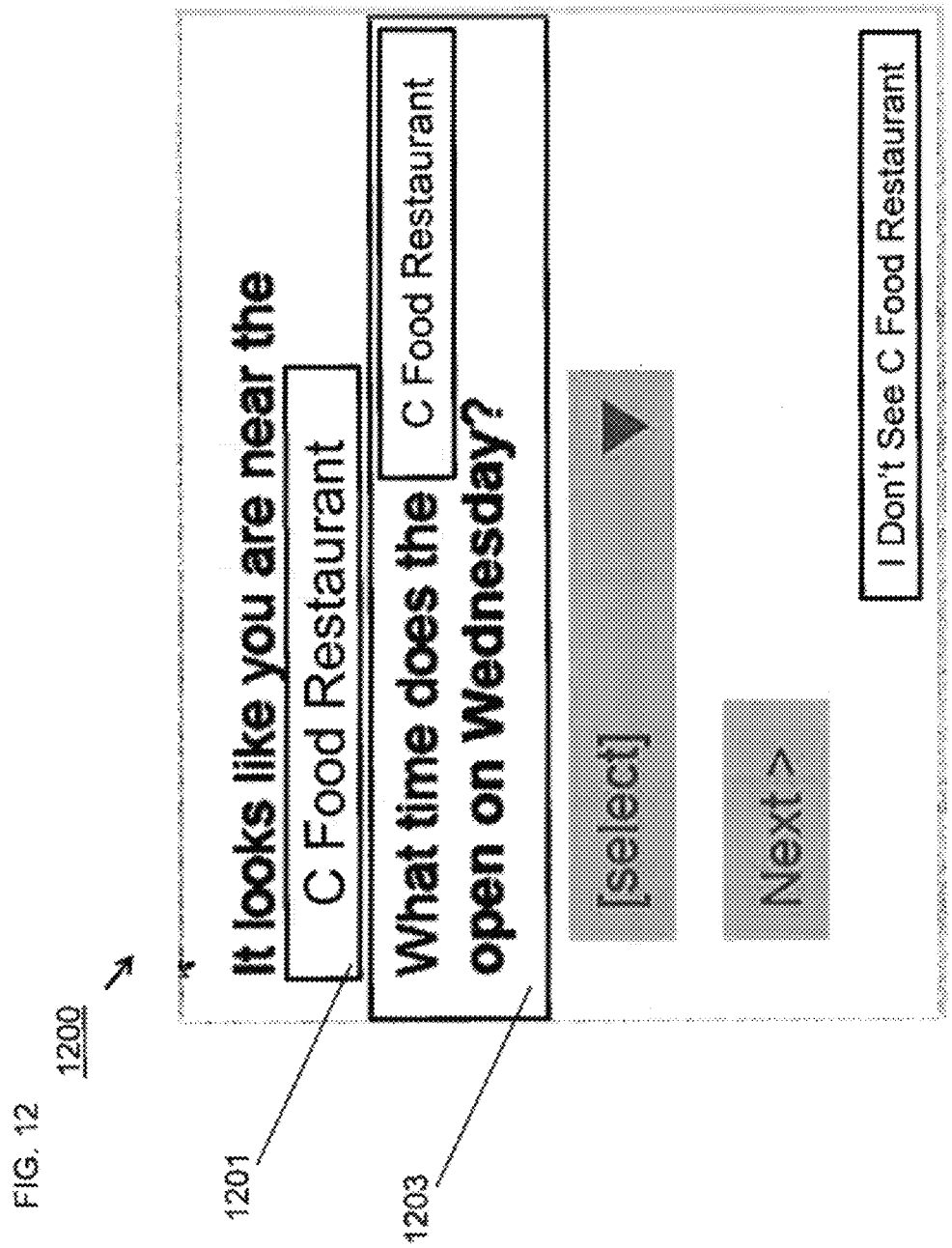

FIG. 12 depicts example 1200 presented at a user device. In one embodiment, the user is presented with a list of one or more POI 1201 located near the user and is challenged to provide one or more points of information 1203 about the POI. In another embodiment, the user is presented with a list of one or more POI 1201 located near the user and is challenged to provide one or more points of information 1203 about the POI, where the information is used to confirm already existing information in one or more databases.

The processes described herein for providing authorization services may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
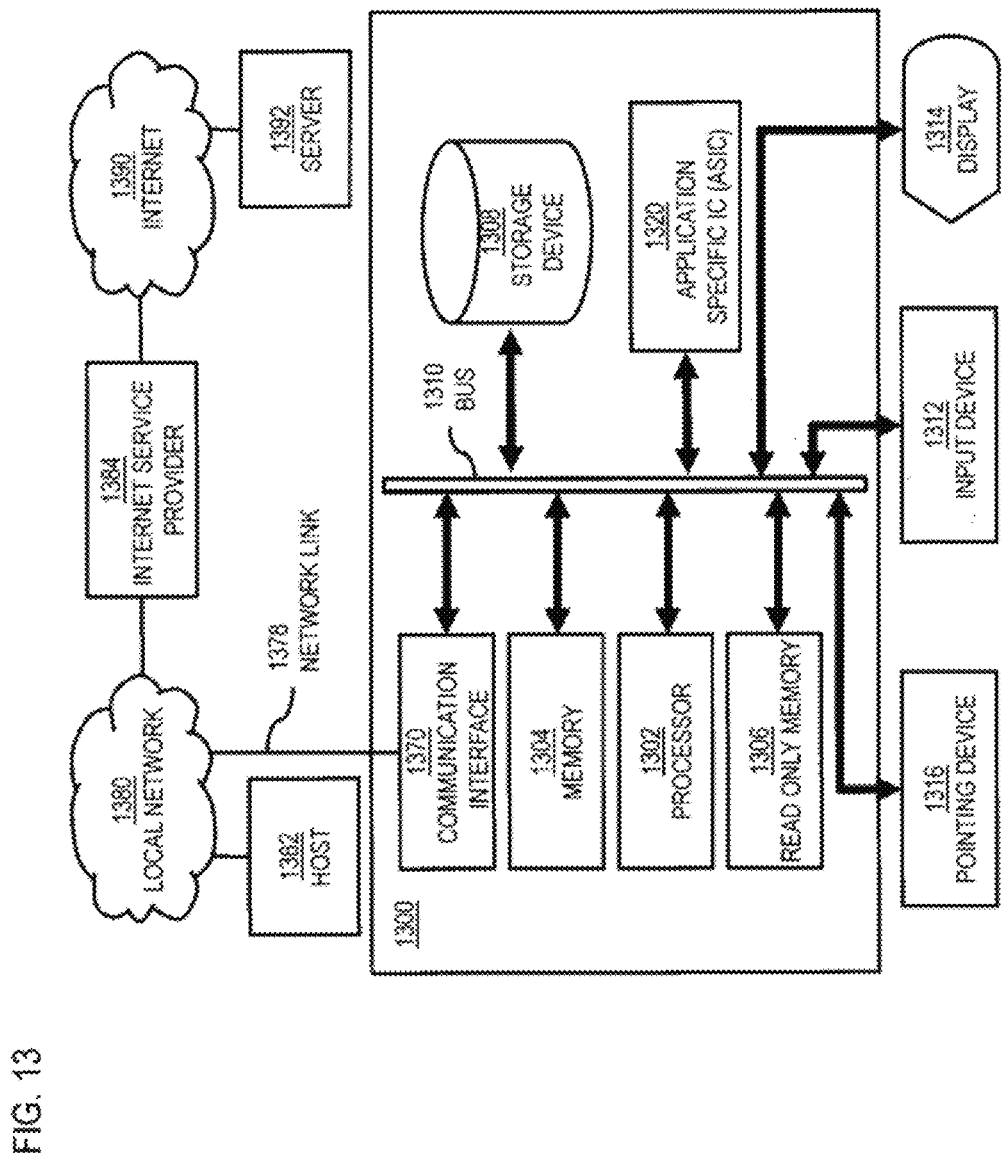
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to provide authorization services as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of providing authorization services.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to providing authorization services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (NOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for providing authorization services. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing authorization services, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 107 for providing authorization services.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
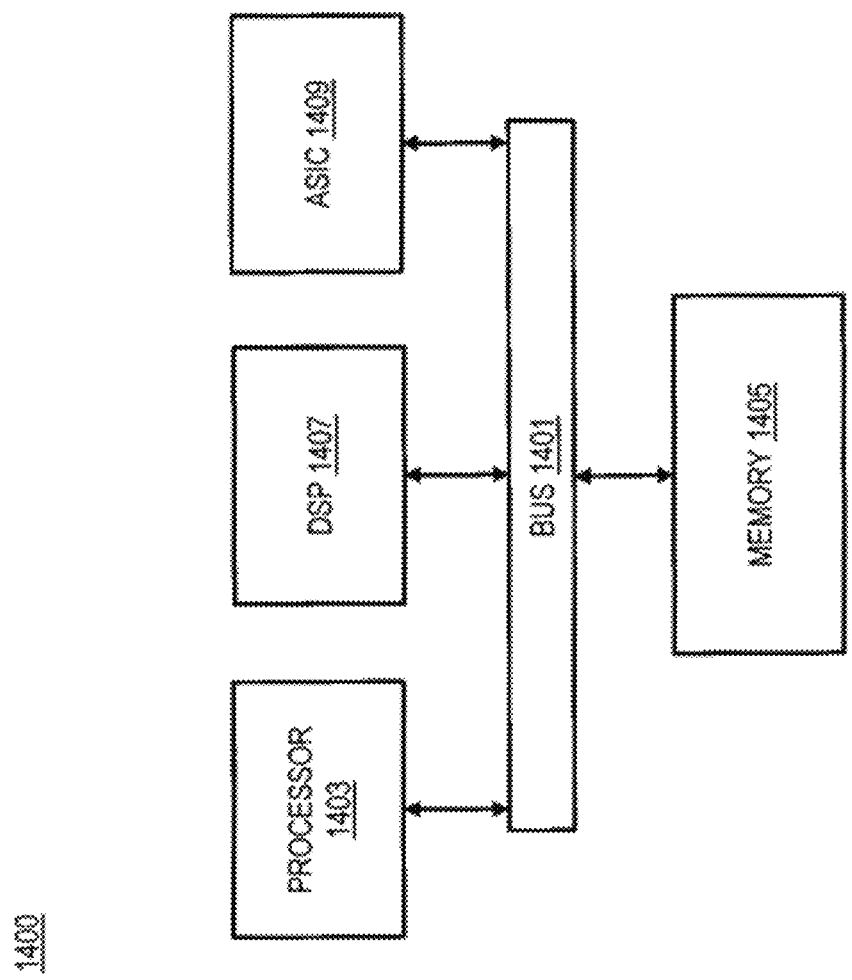
FIG. 14 is a diagram of a chip set that can be used to implement an embodiment of the invention.

FIG. 14 illustrates a chip set or chip 1400 upon which an embodiment of the invention may be implemented. Chip set 1400 is programmed to provide authorization services, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of services. Chip set or chip 1400, or a portion thereof, constitutes a means for performing one or more steps of providing authorization services.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to provide authorization services. The memory 1405 also stores the data associated with or generated by the execution of the inventive steps.

Figure 15:
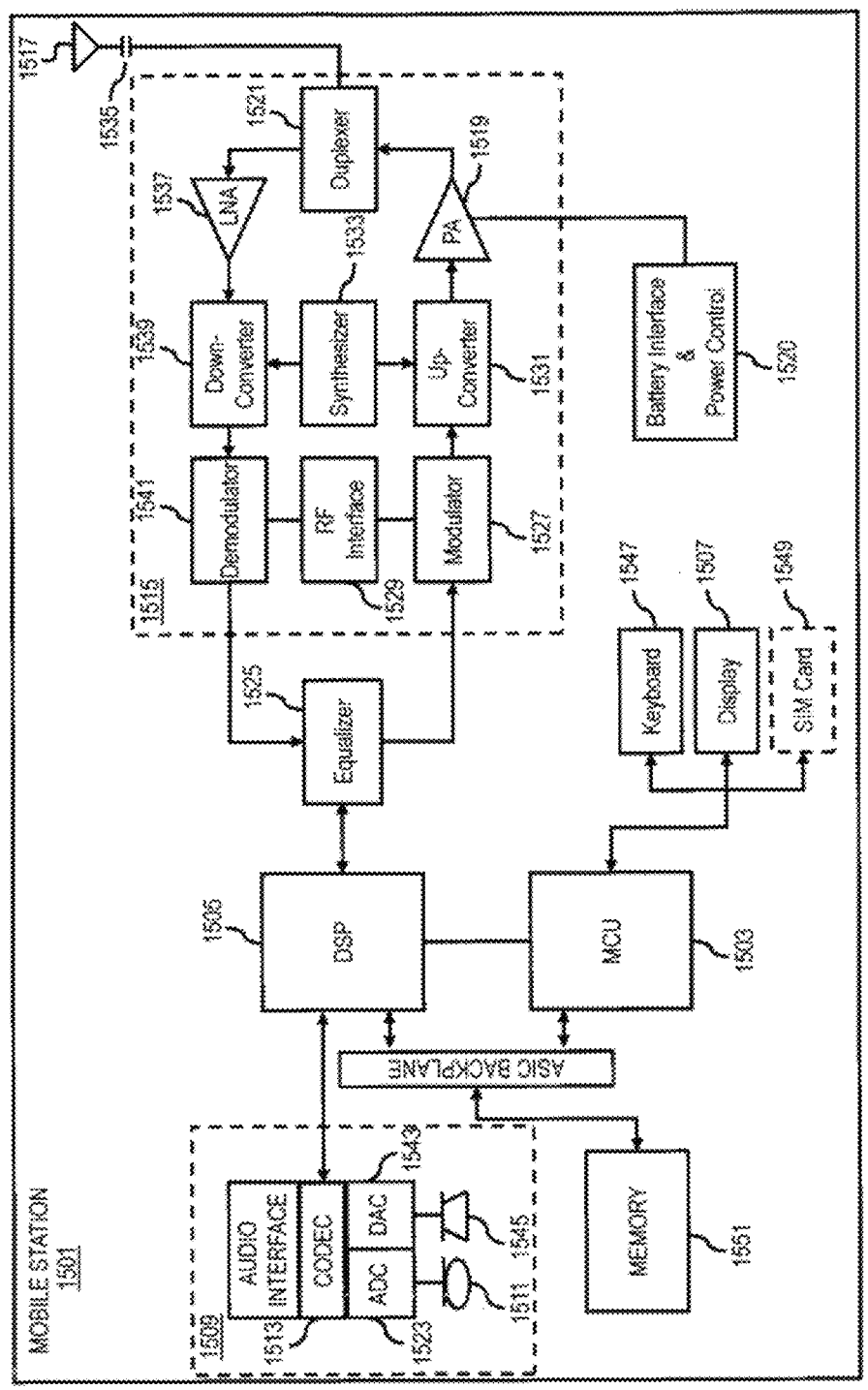
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1500, or a portion thereof, constitutes a means for performing one or more steps of providing authorization services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of providing authorization services. The display 1307 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (Wi-Fi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to interface with one or more authorization services. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of, processing, or combination thereof, (1) data, (2) information, (3) at least one signal, or combination thereof, the (1) data, (2) information, (3) at least one signal or combination thereof, based, at least in part, on the following:
   a request for generating a challenge for a device or a user of the device;
   location information associated with the device;
   at least one determination of one or more characteristics that are detectable based, at least in part, on the location information; and
   a generation of the challenge based, at least in part, on the one or more characteristics,
   a selection of the one or more characteristics for generation of the challenge so that actual detection of the one or more characteristics by a responder to the challenge is necessary when the responder responds to the challenge and indicates that the responder is physically present within proximity of a location identified by the location information and is expected to be human.

2. A method of claim 1, wherein the (1) data, (2) information, (3) at least one signal, or combination thereof, are further based, at least in part, on the following:
   a selection of the one or more characteristics to include at least one known characteristic and at least one unknown characteristic.

3. A method of claim 2, wherein the (1) data, (2) information, (3) at least one signal, or combination thereof, are further based, at least in part, on the following:
   a response to the challenge, the response including a first observation of the known characteristic and a second observation of the unknown characteristic;
   at least one determination of whether the first observation is a substantially accurate representation of the known characteristic;

an association of the second observation with the unknown characteristic based, at least in part, on the determination with respect to accuracy of the representation; and at least one determination to store the association in one or more storage database.

4. A method of claim 1, wherein the (1) data, (2) information, (3) at least one signal, or combination thereof, are further based, at least in part, on the following:
   a response to the challenge, the response including respective observations of the one or more characteristics;
   at least one determination of whether the respective observations are substantially accurate representations of the one or more characteristics; and
   at least one authorization of access to one or more services, one or more content, or a combination thereof based, at least in part, on the determination.

5. A method of claim 1, wherein the (1) data, (2) information, (3) at least one signal, or combination thereof, are further based, at least in part, on the following:
   a varying of a number of the one or more characteristics for the generating of the challenge.

6. A method of claim 1, wherein the one or more characteristics include locations of points of interest, descriptive information of the points of interest, a relative positioning of points of interest, radio frequency fingerprint, environmental conditions, or a combination thereof.

7. An apparatus comprising:
   at least one processor; and
   at least one memory including computer program code,
      wherein the at least one memory and the computer program code configured to, with the at least one processor, cause the apparatus to perform at least the following,
      receive a request for generating an challenge for a device or a user of the device;
      determine location information associated with the device;
      determine one or more characteristics that are detectable based, at least in part, on the location information;
      and generate the challenge based, at least in part, the one or more characteristics, and
   wherein the apparatus is further caused to:
   select the one or more characteristics for generation of the challenge so that actual detection of the one or more characteristics by a responder to the challenge is necessary when the responder responds to the challenge and indicates that the responder is physically present within proximity of a location identified by the location information and is expected to be human.

8. An apparatus of claim 7, wherein the apparatus is further caused to:
   select the one or more characteristics to include at least one known characteristic and at least one unknown characteristic.

9. An apparatus of claim 8, wherein the apparatus is further caused to:
   receive a response to the challenge, the response including a first observation of the known characteristic and a second observation of the unknown characteristic;
   determine whether the first observation is a substantially accurate representation of the known characteristic;
   cause, at least in part, association of the second observation with the unknown characteristic based, at least in part, on the determination with respect to accuracy of the representation; and determine to store the association in a storage database.

10. An apparatus of claim 7, wherein the apparatus is further caused to:
    receive a response to the challenge, the response including respective observations of the one or more characteristics;
    determine whether the respective observations are substantially accurate representations of the one or more characteristics; and
    authorize access to one or more services, one or more content, or a combination thereof based, at least in part, on the determination.

11. An apparatus of claim 7, wherein the apparatus is further caused to:
    vary a number of the one or more characteristics for the generating of the challenge.

12. An apparatus of claim 7, wherein the one or more characteristics include locations of points of interest, descriptive information of the points of interest, a relative positioning of points of interest, radio frequency fingerprint, environmental conditions, or a combination thereof.

13. A non-transitory computer-readable storage medium carrying one or more sequences of one or more instructions which, when executed by one or more processors, cause an apparatus to perform at least the following:
    receiving a request for generating an challenge for a device or a user of the device;
    determining location information associated with the device;
    determining one or more characteristics that are detectable based, at least in part, on the location information; and
    generating the challenge based, at least in part, the one or more characteristics,
    wherein the apparatus is caused to further perform:
    selecting the one or more characteristics for generation of the challenge so that actual detection of the one or more characteristics by a responder to the challenge is necessary when the responder responds to the challenge and indicates that the responder is physically present within proximity of a location identified by the location information and is expected to be human.

14. A non-transitory computer-readable storage medium of claim 13, wherein the apparatus is caused to further perform:
    selecting the one or more characteristics to include at least one known characteristic and at least one unknown characteristic.

* * * * *